United States Patent
Pratt et al.

(10) Patent No.: US 9,923,245 B2
(45) Date of Patent: Mar. 20, 2018

(54) FLUORINATED ALKALI ION ELECTROLYTES WITH URETHANE GROUPS

(71) Applicant: Seeo, Inc, Hayward, CA (US)

(72) Inventors: Russell Clayton Pratt, San Mateo, CA (US); Xiao-Liang Wang, San Leandro, CA (US); Steven Lam, San Jose, CA (US); Hany Basam Eitouni, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 15 days.

(21) Appl. No.: 15/148,827

(22) Filed: May 6, 2016

(65) Prior Publication Data

US 2016/0294012 A1    Oct. 6, 2016

Related U.S. Application Data

(63) Continuation of application No. PCT/US2016/025950, filed on Apr. 5, 2016.

(60) Provisional application No. 62/143,011, filed on Apr. 3, 2015.

(51) Int. Cl.
| | | |
|---|---|---|
| H01M 10/0569 | (2010.01) | |
| H01M 10/0525 | (2010.01) | |
| H01M 4/134 | (2010.01) | |
| H01M 4/131 | (2010.01) | |
| H01M 4/133 | (2010.01) | |
| H01M 4/136 | (2010.01) | |
| H01M 10/052 | (2010.01) | |
| H01M 10/054 | (2010.01) | |

(52) U.S. Cl.
CPC ..... *H01M 10/0569* (2013.01); *H01M 10/052* (2013.01); *H01M 10/054* (2013.01); *H01M 2300/0028* (2013.01)

(58) Field of Classification Search
CPC ............. H01M 10/052; H01M 10/054; H01M 10/0569; H01M 2300/0028; H01M 8/0221; H01M 8/1039; H01M 2300/0082; C08J 5/2256; C08J 5/2262
See application file for complete search history.

(56) References Cited

U.S. PATENT DOCUMENTS

| | | |
|---|---|---|
| 3,821,297 A | 6/1974 | Resnick |
| 8,067,114 B2 | 11/2011 | Kim et al. |
| 9,368,775 B2 | 6/2016 | Visco et al. |
| 2002/0110739 A1 | 8/2002 | McEwen et al. |
| 2002/0127475 A1 | 9/2002 | Marchionni et al. |
| 2003/0049538 A1 | 3/2003 | Buerger et al. |
| 2003/0108800 A1 | 6/2003 | Barbarich |
| 2003/0181572 A1 | 9/2003 | Tan et al. |
| 2004/0043298 A1 | 3/2004 | Lee |
| 2004/0170901 A1 | 9/2004 | Blau et al. |
| 2005/0287441 A1 | 12/2005 | Passerini et al. |
| 2006/0035987 A1 | 2/2006 | Paddison |
| 2006/0127766 A1 | 6/2006 | Yamate |
| 2007/0178133 A1 | 8/2007 | Rolland |
| 2008/0114143 A1 | 5/2008 | Brothers et al. |
| 2009/0004568 A1 | 1/2009 | Hirose et al. |
| 2009/0023038 A1 | 1/2009 | DeSimone et al. |
| 2009/0029249 A1 | 1/2009 | Takami et al. |
| 2009/0182087 A1 | 7/2009 | Fudemoto et al. |
| 2011/0111308 A1 | 5/2011 | Halalay et al. |
| 2011/0281173 A1 | 11/2011 | Singh et al. |
| 2012/0121989 A1 | 5/2012 | Roberts et al. |
| 2013/0063092 A1 | 3/2013 | Yang et al. |
| 2013/0130069 A1 | 5/2013 | Mullin et al. |
| 2013/0228950 A1 | 9/2013 | DeSimone et al. |
| 2013/0273419 A1 | 10/2013 | Pistorino et al. |
| 2014/0221689 A1 | 8/2014 | Klun et al. |
| 2016/0028114 A1 | 1/2016 | Pratt et al. |
| 2016/0093895 A1 | 3/2016 | Du et al. |
| 2016/0211498 A1 | 7/2016 | Kim et al. |
| 2016/0221926 A1 | 8/2016 | Teran et al. |
| 2016/0226101 A1 | 8/2016 | Teran et al. |
| 2016/0226102 A1 | 8/2016 | Teran et al. |
| 2016/0226103 A1 | 8/2016 | Teran et al. |
| 2016/0329613 A1 | 11/2016 | Kusachi et al. |
| 2017/0117583 A1 | 4/2017 | Matsuno et al. |

FOREIGN PATENT DOCUMENTS

| | | |
|---|---|---|
| JP | 2009206004 A | 9/2009 |
| WO | 2007142731 A2 | 12/2007 |
| WO | 2010083325 | 7/2010 |
| WO | 2011051275 A1 | 5/2011 |
| WO | 2014190278 A1 | 11/2014 |
| WO | 2014204547 A2 | 12/2014 |
| WO | 2015022229 A1 | 2/2015 |

OTHER PUBLICATIONS

C.-C. Chen, W.-J. Liang, P.-L. Kuo. Solid Polymer Electrolytes III: Preparation, Characterization, and Ionic Conductivity of New Gelled Polymer Electrolytes Based on Segmented, Perfluoropolyether-Modified Polyurethane, Journal of Polymer Science: Part A: Polymer Chemistry, vol. 40, 486-495 (2002).*
Smart. "Improved performance of lithium-ion cells with the use of fluorinated carbonate-based electrolytes," Journal of Power Sources 119-121 (2003) 359-367.
International Search Report for PCT/US16/31685, dated Aug. 16, 2016.
International Search Report for PCT/US2016/025950, dated Jun. 27, 2016.
International Search Report for PCT/US2016/030602.
International Search Report for PCT/US2016/032541.
International Search Report for PCT/US2016/033967 dated Aug. 23, 2016.

(Continued)

*Primary Examiner* — Carlos Barcena
(74) *Attorney, Agent, or Firm* — R'Sue Popowich Caron

(57) ABSTRACT

Perfluoropolyether electrolytes terminated with polar substituents such as dimethylurethanes show enhanced ionic conductivities when formulated with lithium bis(trifluoromethane)sulfonimide, making them useful as electrolytes for lithium cells.

8 Claims, No Drawings

(56) References Cited

OTHER PUBLICATIONS

Wong et al.: Nonflammable perfluoropolyether-based electrolytes for lithium batteries. PNAS. 111, 9. 3327-3331; Mar. 4, 2014. [retrieved on May 18, 2016}. Retrieved from the Internet. <URL: http://www.pnas.org/contentl111/9/3327.full.pdf>. entire document.
Machine Translation of JP2009-206004A.

* cited by examiner

FLUORINATED ALKALI ION ELECTROLYTES WITH URETHANE GROUPS

CROSS-REFERENCE TO RELATED APPLICATIONS

This application is a continuation of International Patent Application Number PCT/US16/25950, filed Apr. 5, 2016, which, in turn, claims priority to U.S. Provisional Patent Application 62/143,011, filed Apr. 3, 2015, both of which are incorporated by reference herein.

BACKGROUND OF THE INVENTION

Field of the Invention

This invention relates generally to electrolytes for use in electrochemical cells that employ alkali metals, and, more specifically, to fluorinated electrolytes for use in lithium-containing batteries.

Batteries based on lithium ion transfer work best with electrolytes that have high ionic conductivities and high stabilities. High ionic conductivities are useful because they facilitate ionic transfer, resulting in high power and low polarization. Highly stable batteries are those that are non-flammable and do not undergo undesired reactions with either anode or cathodes.

Perfluoropolyethers terminated with methoxycarbonyl groups has been reported as lithium ion electrolytes when formulated with lithium bis(trifluoromethane)sulfonimide (see www.pnas.org/cgi/doi/10.1073/pnas.1314615111 and International Application Publication WO 2014/204547 A2). These electrolytes were reported to have excellent fire resistance and high lithium ion transference, though the ionic conductivities were not particularly high at about $10^{-5}$ S cm$^{-1}$ at 80° C.

What is needed is an electrolyte that provides high lithium ion transference, excellent stability and high ionic conductivities to realize the full potential of lithium batteries that employ them.

SUMMARY

In the embodiments of the invention, as disclosed herein, an electrolyte is a mixture that includes perfluoropolyethers that have either one or two terminal urethane groups and an alkali metal salt. The alkali metal salt can be a lithium salt, a sodium salt, a potassium salt, or a cesium salt. The salt can make up between 5 and 30 wt % of the electrolyte composition.

The perfluoropolyethers can be either of the following:

wherein x is the mole fraction of difluoromethyleneoxy groups in the perfluoropolyether, and x ranges between 0 and 1; 1-x is the mole fraction of tetrafluoroethyleneoxy groups in the perfluoropolyether, and 1-x ranges between 0 and 1; n is the average total number of randomly co-distributed difluoromethyleneoxy and tetrafluoroethyleneoxy groups in the perfluoropolyether and n ranges between 1 and 50; X is either hydrogen or fluorine; and $R^F$ is a perfluorinated C1-C8 straight or branched alkyl group.

In one arrangement, $R^1$ and $R^2$ are each chosen independently from the group consisting of short chain straight or branched C1-C4 alkyl, 2-methoxyethyl, 2-(2-methoxy)ethoxyethyl, and cyanoethyl. In another arrangement, le and $R^2$ are combined with the N in a C5-C8 heterocycloalkyl group selected from the group consisting of pyrrolidine, piperidine, morpholine, and 4-methylpiperazine. In yet another arrangement, le and/or $R^2$ is hydrogen.

In another embodiment of the invention, an electrochemical cell has an anode, a cathode, and an electrolyte, as described above, between the anode and the cathode. The electrolyte provides ionic communication between the anode and the cathode. The anode may be made of graphite, lithium titanante, silicon and/or a silicon alloy. The cathode may be made of a material such as nickel cobalt aluminum oxide (NCA), nickel cobalt manganese (NCM), LiCoO$_2$, LiFePO$_4$, LiNiPO$_4$, LiCoPO$_4$, and LiMn$_2$O$_4$ particles, and any combination thereof.

DETAILED DESCRIPTION

The aforementioned needs are satisfied by the process of the present invention which describes perfluoropolyether electrolytes terminated with urethane (a.k.a. carbamate) substituents such as N,N-dimethylurethane which show enhanced ionic conductivities when formulated with lithium bis(trifluoromethane)sulfonimide, making them useful as lithium cell electrolytes.

Examples of fluoropolymers and perfluoropolymers include but are not limited to fluoropolyethers and perfluoropolyethers, poly(perfluoroalkyl acrylate), poly(perfluoroalkyl methacrylate), polytetrafluoroethylene, polychlorotrifluoroethylene, and polyvinylidene fluoride, and copolymers thereof.

Examples of perfluoropolyethers include but are not limited to polymers that include a segment such as a difluoromethylene oxide, tetrafluoroethylene oxide, hexafluoropropylene oxide, tetrafluoroethylene oxide-co-difluoromethylene oxide, hexafluoropropylene oxide-co-difluoromethylene oxide, or a tetrafluoroethylene oxide-cohexafluoropropylene oxide-co-difluoromethylene oxide segments and combinations thereof.

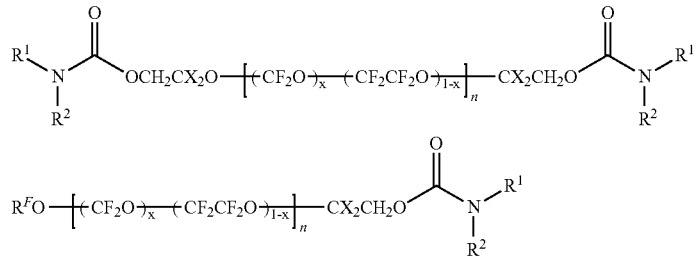

As stated above, perfluoropolyethers terminated with methoxycarbonyl (MC) groups have been reported as lithium ion electrolytes when formulated with lithium bis(trifluoromethane)sulfonimide. Examples of these are shown below.

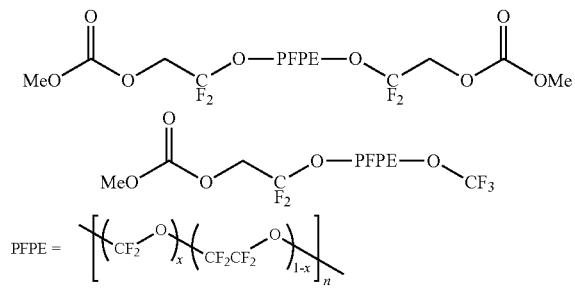

The methyl carbonate termini of these polymers enhance the solubility of lithium salt in the electrolyte when compared to the diol precursors. However, linear carbonate groups do not make an inherently good solvent for salts: as analogues, solvents such as dimethyl carbonate and diethyl carbonate have almost no ability to dissolve lithium salts. Therefore it is likely that other functional groups may provide better salt solubilities and higher ionic conductivities.

Some new materials made from perfluoropolyethers terminated with structures significantly different from the methyl carbonate group have been synthesized and have been found to provide higher ionic conductivities than comparable methyl carbonate-terminated perfluoropolyethers. This represents a new class of compounds that can be especially useful as lithium ion electrolytes.

This new class of compounds can be generalized as either of the following chemical structures. The first is terminated by a urethane at both ends. The second is terminated by a urethane group at one end.

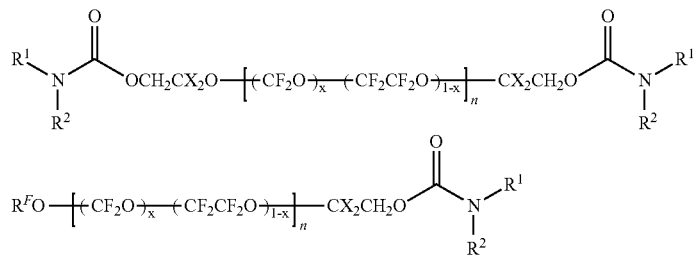

wherein x ($0 \leq x \leq 1$) is the mole fraction of difluoromethyleneoxy groups in the perfluoropolyether, 1-x ($0 \leq x \leq 1$) is the mole fraction of tetrafluoroethyleneoxy groups in the perfluoropolyether, n ($1 \leq n \leq 50$) is the average total number of randomly codistributed difluoromethyleneoxy and tetrafluoroethyleneoxy groups in the perfluoropolyether, and X is either H or F. $R^F$ is a perfluorinated C1-C8 straight or branched alkyl group.

In one arrangement, the $R^1$ and $R^2$ substituents are each chosen independently from short chain straight or branched C1-C4 alkyl, 2-methoxyethyl, 2-(2-methoxy)ethoxyethyl, or cyanoethyl. In another arrangement, $R^1$ and $R^2$ can be combined with the N in a C5-C8 heterocycloalkyl group such as pyrrolidine, piperidine, morpholine, or 4-methylpiperazine. In yet another arrangement, $R^1$ and/or $R^2$ is hydrogen.

The terminal group consisting of an oxygen-carbonyl-nitrogen link (O—C(=O)—N) is known as a carbamate or urethane group. This class of compounds may therefore be generally referred to as urethane-terminated perfluoropolyethers. The urethane group differs from the methyl carbonate group by substitution of a nitrogen. The effect of a nitrogen atom as compared to an oxygen atom is more easily appreciated in small molecules, such as in the properties of an ester and amide. Methyl acetate has a boiling point (57-58° C.), has modest miscibility with water, and is a poor solvent for salts. N,N-Dimethylacetamide has a much higher boiling point (165° C.), is completely miscible with water, and is a good organic solvent for salts. The last property in particular reflects the advantage of using urethane groups over methyl carbonate groups to terminate perfluoropolyethers for use as electrolytes: salts are more likely to be dissolved and mobile. It is also more likely for the urethane-terminated perfluoropolyethers to dissolve appreciable amounts of lithium salts other than LiTFSI, which can be useful when formulating electrolytes.

Salts that can be used in the embodiments of the invention include, but are not limited to, alkali metal salts such as lithium salts, sodium salts, potassium salts, and cesium salts. Examples of lithium salts include, but are not limited to, $LiPF_6$, $LiBF_4$, Li(BOB), $LiClO_4$, LiBETI, and LiTCB. Concentration of alkali metal salts in the electrolytes disclosed herein range from 5 to 50 wt %, 5 to 30 wt %, 10 to 20 wt %, or any range subsumed therein.

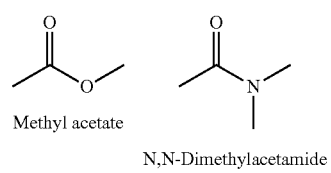

Methyl acetate

N,N-Dimethylacetamide

The linear carbonate group is not inherently strongly polar and its presence does not enhance the solubility of salts, a property crucial for electrolytes. Incorporation of other more polar groups, such as the urethane group, imparts a higher polarity and results in better salt solubility. Polarity refers to a separation of electric charge leading to a molecule or its chemical groups having an electric dipole or multipole moment. Polar molecules interact through dipole-dipole intermolecular forces and hydrogen bonds. Molecular polarity is dependent on the difference in electronegativity between atoms in a compound and the asymmetry of the compound's structure. Polarity underlies a number of physical properties including surface tension, solubility, and melting and boiling-points. Polar groups can also facilitate dissociation of lithium salts in an electrolyte; the better the dissociation of lithium salts, the higher the ionic conductivity in the electrolyte.

Urethane-terminated perfluoropolyether compounds maintain the advantages of perfluoropolyethers as electrolytes that have been previously cited, including low flammability and vapor pressure (for safety and convenience), low melting point (enabling use at low temperatures, even below 0° C.), and electrochemical inertness over a wide voltage range (appropriate for use inside an electrochemical device).

In another embodiment of the invention, any of the electrolyte disclosed herein is used in an electrochemical cell, such as a battery. The cell has an anode, a cathode, and the electrolyte between the anode and the cathode. The electrolyte provides ionic communication between the anode and the cathode. In one arrangement, the anode is made of graphite, lithium titanante, silicon and/or a silicon alloy. In one arrangement, the cathode is made of a material such as nickel cobalt aluminum oxide (NCA), nickel cobalt manganese (NCM), $LiCoO_2$, $LiFePO_4$, $LiNiPO_4$, $LiCoPO_4$, and $LiMn_2O_4$ particles, and any combination thereof.

EXAMPLES

The following examples provide details relating to composition, fabrication and performance characteristics of lithium ion electrolytes in accordance with the present invention. It should be understood the following is representative only, and that the invention is not limited by the detail set forth in these examples.

Synthesis of dimethylurethane-terminated perfluoropolyether 1: A solution of 1H,1H,8H,8H-octafluoro-3,6-dioxaoctane-1,8-diol (5.0 g) and dimethylcarbamoyl chloride (4.39 g) in diethyl ether (80 mL) was prepared in a septum-capped flask and chilled in cold water. A solution of potassium tert-butoxide (4.58 g) in tetrahydrofuran (40 mL) was added by syringe over 5 minutes. The mixture was stirred for 16 hours. Water (50 ml) was added and the organic layer was retained, washed with 40 mL of 1 M hydrochloric acid, dried over magnesium sulfate, and filtered. Evaporation of solvents and volatiles to constant weight left 6.96 g of clear oil, identified by $^1H$— and $^{19}F$—NMR methods as the desired product.

Scheme. Synthesis of 1

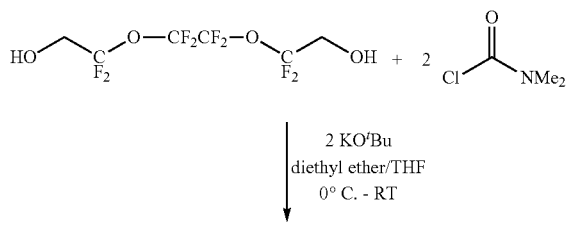

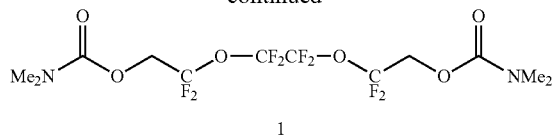

1

Synthesis of dimethylurethane-terminated polyfluoropolyether 2: A similar procedure was used as for the synthesis of 1, using 1H,1H,11H,11H— perfluoro-3,6,9-trioxaundecane-1,11-diol (5.0 g) as the starting material and adjusting the amounts of other reagents accordingly. The product was isolated as a clear oil.

Synthesis of methyl carbonate-terminated polyfluoropolyether 3: A solution of 1H,1H,8H,8H-octafluoro-3,6-dioxaoctane-1,8-diol (10.0 g), trimethylamine (8.59 g) and diethyl ether (160 mL) was prepared in a 500 mL flask and chilled in an ice-water bath for 15 minutes. A solution of methyl chloroformate (7.71 g) in diethyl ether (40 mL) was added at 2 mL/min over 20 minutes with continuous stirring and chilling of the reaction flask. The ice bath was removed and the solution was stirred for 16 hours. The reaction was then transferred to a separatory funnel and washed with 2×50 mL 1 M hydrochloric acid, 1×50 mL distilled water, and 1×50 mL saturated aqueous sodium chloride solution. The retained organic layer was dried over magnesium sulfate and filtered before solvent was removed by evaporation leaving a cloudy yellow oil. The oil was washed with 2×10 mL hexane, then re-dissolved in 30 mL of 2:1 ethyl acetate/hexane and treated with 0.5 g of decolorizing charcoal for 30 minutes. The charcoal was removed by centrifugation and filtration and the solvent removed by evaporation leaving 12 g of a clear colorless oil, identified by $^1H$ and $^{19}F$—NMR methods as the desired product.

Scheme. Synthesis of 3

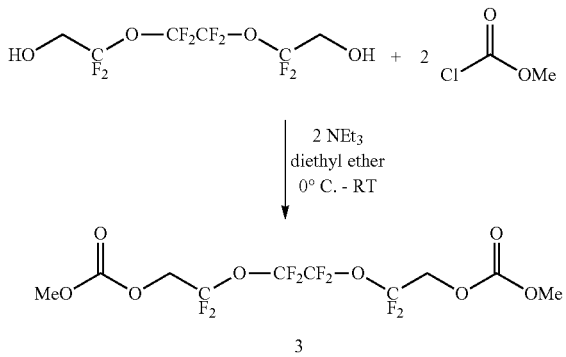

3

Synthesis of methyl carbonate-terminated polyfluoropolyether 4: A similar procedure was used as for the synthesis of 3, using 1H,1H,11H,11H— perfluoro-3,6,9-trioxaundecane-1,11-diol (10.0 g) as the starting material and adjusting the amounts of other reagents accordingly. The product was isolated as 11 g of a clear oil.

Electrolytes Made from New Materials

Electrolyte solutions were formed by dissolving 10 wt % lithium bis(trifluoromethane) sulfonimide (LiTFSI) in the appropriate liquid. The ionic conductivities of the electrolytes were measured by constructing symmetric coin cells with porous polyolefin separators soaked through with the LiTFSI solution and performing electrochemical impedance spectroscopy. The results are shown below in Table I. Conductivity results for methyl carbonate-terminated perfluoropolyethers 3 and 4 are shown for comparison.

TABLE I

Ionic conductivities of perfluoropolyether-LiTFSI electrolytes

| Electrolyte (with 10 wt % LiTFSI) | Conductivity at 40° C. (S cm$^{-1}$) | Conductivity at 80° C. (S cm$^{-1}$) |
|---|---|---|
| 1 | 3.6 × 10$^{-5}$ | 1.1 × 10$^{-4}$ |
| 2 | 2.8 × 10$^{-5}$ | 8.8 × 10$^{-5}$ |
| 3 | 9.0 × 10$^{-6}$ | 1.5 × 10$^{-5}$ |
| 4 | 5.6 × 10$^{-6}$ | 1.5 × 10$^{-5}$ |

Thus, urethane-terminated electrolytes (1 and 2) have ionic conductivities 4 to 10 times greater than those of the methyl carbonate-terminated electrolytes (3 and 4) under similar conditions.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrolyte, comprising:
   a mixture of
   perfluoropolyethers, each having either one or two terminal urethane groups covalently coupled thereto; and
   an alkali metal salt.

2. The electrolyte of claim 1, wherein said alkali metal salt is a lithium salt.

3. The electrolyte of claim 1, wherein said alkali metal salt is a sodium salt.

4. The electrolyte of claim 1, wherein the alkali metal salt comprises between 5 to 30 wt % of the mixture.

5. The electrolyte of claim 1, wherein the perfluoropolyethers are selected from the group consisting of:

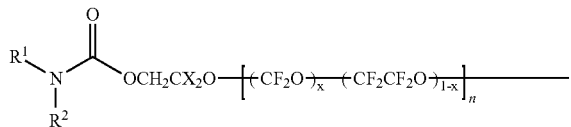

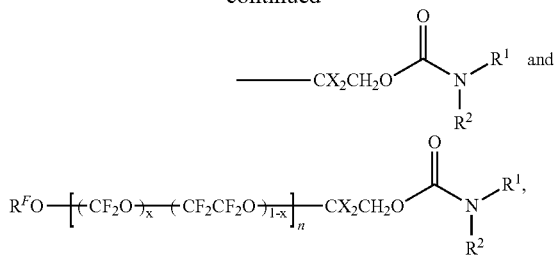

wherein x is the mole fraction of difluoromethyleneoxy groups in the perfluoropolyether, and x ranges between 0 and 1;

1-x is the mole fraction of tetrafluoroethyleneoxy groups in the perfluoropolyether, and 1-x ranges between 0 and 1;

n is the average total number of randomly co-distributed difluoromethyleneoxy and tetrafluoroethyleneoxy groups in the perfluoropolyether and n ranges between 1 and 50;

X is either hydrogen or fluorine;

—$R^F$— is a perfluorinated C1-C8 straight or branched alkyl group; and $R^1$ and $R^2$ are each chosen independently from the group consisting of hydrogen and short chain straight or branched C1-C4 alkyl, 2-methoxyethyl, 2-(2-methoxy) ethoxyethyl, and cyanoethyl; or $R^1$ and $R^2$ are combined with the N in a C5-C8 heterocycloalkyl group selected from the group consisting of pyrrolidine, piperidine, morpholine, and 4-methylpiperazine.

6. An electrochemical cell, comprising:
   an anode;
   a cathode; and
   an electrolyte between the anode and the cathode, the electrolyte in ionic communication with the anode and the cathode;
   wherein the electrolyte is the electrolyte of claim 1.

7. The cell of claim 6, wherein the anode comprises a material selected from the group consisting of graphite, lithium titanante, silicon, silicon alloys, and combinations thereof.

8. The cell of claim 6, wherein the cathode comprises a material selected from the group consisting of nickel cobalt aluminum oxide (NCA), nickel cobalt manganese (NCM), LiCoO2, LiFePO4, LiNiPO4, LiCoPO4, and LiMn2O4 particles, and any combination thereof.

* * * * *